(12) United States Patent
Yoshida et al.

(10) Patent No.: US 8,148,859 B2
(45) Date of Patent: Apr. 3, 2012

(54) COOLING STRUCTURE FOR INVERTER AND CAPACITOR ACCOMMODATED INTEGRALLY WITH MOTOR IN HOUSING OF MOTOR, MOTOR UNIT WITH COOLING STRUCTURE, AND HOUSING

(75) Inventors: Tadafumi Yoshida, Nisshin (JP); Masaki Yoshino, Toyota (JP); Yutaka Hotta, Chiryu (JP)

(73) Assignees: Toyota Jidosha Kabushiki Kaisha, Aichi-Ken (JP); Aisin AW Co., Ltd., Aichi-Ken (JP)

( * ) Notice: Subject to any disclaimer, the term of this patent is extended or adjusted under 35 U.S.C. 154(b) by 275 days.

(21) Appl. No.: 12/446,671

(22) PCT Filed: Oct. 30, 2007

(86) PCT No.: PCT/JP2007/071462
§ 371 (c)(1),
(2), (4) Date: Apr. 22, 2009

(87) PCT Pub. No.: WO2008/059723
PCT Pub. Date: May 22, 2008

(65) Prior Publication Data
US 2010/0013331 A1    Jan. 21, 2010

(30) Foreign Application Priority Data
Nov. 16, 2006 (JP) ................... 2006-310338

(51) Int. Cl.
*H02K 9/19* (2006.01)

(52) U.S. Cl. ................ 310/54; 310/52; 310/64

(58) Field of Classification Search .......... 310/52, 310/54, 64; *H02K 9/19*
See application file for complete search history.

(56) References Cited

U.S. PATENT DOCUMENTS

| | | | | |
|---|---|---|---|---|
| 6,166,937 | A * | 12/2000 | Yamamura et al. | 363/141 |
| 6,198,183 | B1 * | 3/2001 | Baeumel et al. | 310/52 |
| 6,201,365 | B1 * | 3/2001 | Hara et al. | 318/558 |
| 6,323,613 | B1 * | 11/2001 | Hara et al. | 318/471 |
| 6,599,104 | B2 * | 7/2003 | Saito et al. | 417/366 |
| 6,822,353 | B2 * | 11/2004 | Koga et al. | 310/64 |
| 7,009,318 | B2 * | 3/2006 | Iritani et al. | 310/58 |
| 7,030,520 | B2 * | 4/2006 | Takenaka et al. | 310/64 |
| 7,211,912 | B2 * | 5/2007 | Takenaka et al. | 310/54 |
| 7,719,838 | B2 * | 5/2010 | Nakajima et al. | 361/699 |
| 7,800,260 | B2 * | 9/2010 | Komatsu et al. | 310/54 |
| 2003/0206815 | A1 | 11/2003 | Iritani | |
| 2006/0232146 | A1 * | 10/2006 | Bald | 310/52 |

FOREIGN PATENT DOCUMENTS

JP    04-000242 A    1/1992

(Continued)

*Primary Examiner* — Quyen Leung
*Assistant Examiner* — Thomas Truong
(74) *Attorney, Agent, or Firm* — Sughrue Mion, PLLC (57) ABSTRACT

Inside a housing, there are provided a motor generator (MG), an IPM, and a smoothing capacitor. Between the MG and the IPM, there is provided a cooler through which a coolant liquid flows, provided in an inclined manner to form contact with the top face of the IPM. Between the MG and the smoothing capacitor, there are provided a first communication channel through which an LLC flows from a region outside the housing into the cooler, brought into contact with a lateral face of the smoothing capacitor, and a second communication channel through which the LLC flows from the interior of the cooler to the region outside the housing.

2 Claims, 6 Drawing Sheets

| | FOREIGN PATENT DOCUMENTS | | |
|---|---|---|---|
| JP | 10-248198 A | 9/1998 | |
| JP | 11-346480 A | 12/1999 | |
| JP | 2001-119961 A | 4/2001 | |
| JP | 2001-251814 A | 9/2001 | |
| JP | 2002-078356 A | 3/2002 | |
| JP | 2003-199363 A | 7/2003 | |
| JP | 2003-324900 A | 11/2003 | |
| JP | 2003-324903 A | 11/2003 | |
| JP | 2004-343845 A | 12/2004 | |

* cited by examiner

COOLING STRUCTURE FOR INVERTER AND CAPACITOR ACCOMMODATED INTEGRALLY WITH MOTOR IN HOUSING OF MOTOR, MOTOR UNIT WITH COOLING STRUCTURE, AND HOUSING

TECHNICAL FIELD

The present invention relates to the cooling technique for an inverter and capacitor accommodated integrally in a housing of a motor, particularly to the technique of suppressing heat transfer from the motor to the inverter and capacitor.

BACKGROUND ART

There is conventionally known an inverter-integrated motor allowing simplification and downsizing of the structure by providing an inverter and motor integrally. In recent years, there is a demand for reducing the size of the inverter-integrated motor since such inverter-integrated motors are now mounted on a vehicle (electric car, hybrid vehicle, or the like) that runs with the motor driven by an alternating current converted by the inverter. Accordingly, there is also the demand for reducing the size of the cooling structure for the motor and inverter. Japanese Patent Laying-Open No. 2003-324903, for example, discloses the approach to reduce the size of a cooling structure for an inverter-integrated motor.

The inverter-integrated motor for a vehicle disclosed in Japanese Patent Laying-Open No. 2003-324903 includes a motor unit accommodated in a housing, and inverter circuitry fixed to the housing, converting direct-current power into three-phase alternating-current power for supply to the motor unit. The inverter circuitry includes a power switching element constituting each arm of a three-phase inverter circuit, a smoothing capacitor connected between a pair of direct-current input terminals of the three-phase inverter circuit, a control circuit controlling the power switching element, and a wiring connecting the switching element, smoothing capacitor, and control circuit. The housing includes a low-pressure coolant gas inlet and a low-pressure coolant gas outlet.

According to the inverter-integrated motor for a vehicle disclosed in Japanese Patent Laying-Open No. 2003-324903, the housing in which the motor is accommodated is cooled by low-pressure coolant gas. The power switching element and the smoothing capacitor constituting the inverter unit are fixed to the housing of the motor. Accordingly, the motor, power switching element, and smoothing capacitor can be cooled by the housing that has been reduced in temperature by the low-pressure coolant gas without having to provide independent cooling structures for respective components. This allows reduction in the size of the cooling structure.

However, the inverter-integrated motor for a vehicle of Japanese Patent Laying-Open No. 2003-324903 is absolutely silent about the specific location of the path of the low-pressure coolant gas. Therefore, in the case where a channel for the coolant is not provided at the housing between the motor and the power switching element, the heat from the motor may not be absorbed by the coolant and be undesirably transferred to the power switching element via the housing. Similarly, in the case where a channel for the coolant is not provided at the housing between the motor and the smoothing capacitor, the heat from the motor may be undesirably transferred to the smoothing capacitor via the housing. There is a possibility of the electronic switching element and smoothing capacitor being degraded in function.

DISCLOSURE OF THE INVENTION

The present invention is directed to solve the problems set forth above. An object of the present invention is to provide a cooling structure for an inverter and capacitor accommodated integrally with a motor in a housing of the motor, capable of blocking heat transfer from the motor to the inverter and capacitor, a motor unit with the cooling structure, and a housing.

The cooling structure of the present invention is directed to a cooling structure for an inverter and a capacitor accommodated integrally with a motor in a housing of the motor. The cooling structure includes a flow channel through which a coolant flows, provided between the motor and the inverter, and a communication channel provided between the motor and the capacitor, establishing communication between the flow channel and a region outside the housing to allow flow of the coolant between the flow channel and the region outside the housing.

In accordance with the present invention, the inverter is cooled by the coolant flowing through the flow channel. This flow channel is located between the motor and the inverter. Therefore, the heat transfer from the motor to the inverter can be blocked intentionally by the flow channel. The coolant flows through the communication channel establishing communication between flow channel and the region outside the housing to dissipate heat by means of, for example, a radiator or the like, provided outside the housing. The communication channel is located between the motor and the capacitor. Therefore, the heat transfer from the motor to the capacitor can be blocked intentionally by the communication channel. Thus, there can be provided a cooling structure for an inverter and capacitor accommodated integrally with a motor in a housing of the motor, capable of blocking heat transfer from the motor to the inverter and the capacitor.

Preferably, the coolant is a liquid coolant. The communication channel is provided upper than the flow channel, establishing communication between the flow channel and the region outside the housing, upper than the flow channel.

According to the present invention, a liquid coolant flows through the flow channel and the communication channel. The flow channel establishes communication with the region outside the housing, upper than the flow channel, through the communication channel. Accordingly, the air introduced into the flow channel can be elevated in the communication channel to be discharged outside the housing. Therefore, degradation in the cooling performance caused by the air accumulated in the flow channel and communication channel can be suppressed.

Further preferably, the flow channel is provided below the motor in an inclined manner. The communication channel is provided at a lateral side of the motor, establishing communication between an upper end portion of the flow channel and the region outside the housing.

The inclination of the flow channel in the present invention allows the air introduced in the flow channel to be elevated to the upper end portion of the flow channel. The air elevated to the upper end portion of the flow channel is further elevated through the communication channel to be discharged outside the housing. Therefore, accumulation of air in the flow channel can be suppressed more reliably.

Further preferably, the flow channel further includes an outlet through which a coolant is discharged, provided at a lower end portion of the flow channel.

According to the present invention, the outlet of the coolant is provided at the lower end portion of the flow channel. Therefore, the liquid coolant in the flow channel and communication channel can be discharged by its own weight by opening the drain outlet. Therefore, at the time of exchanging the coolant, the event of the coolant persistently remaining in the flow channel and communication channel can be suppressed.

Further preferably, the communication channel includes a first communication channel through which a coolant flows from the region outside the housing into the flow channel, and a second communication channel provided closer to the motor than the first communication channel, and through which the coolant flows from the flow channel out to the region outside the housing.

According to the present invention, the second communication channel through which the coolant in the flow channel absorbing the heat from the inverter and motor flows to the region outside the housing is provided closer to the motor than the first communication channel through which the coolant outside the housing flows into the flow channel. Accordingly, the heat from the motor will not be transferred to the capacitor as long as passage through the second communication channel and the first communication channel is avoided. Therefore, the heat transfer from the motor to the capacitor can be blocked more reliably. Further, the coolant absorbing the heat from the inverter and motor will not flow to the first communication channel provided at the capacitor side. Therefore, transfer of the heat from the inverter and motor towards the capacitor through the coolant can be suppressed.

Further preferably, the flow channel includes a first flow channel brought into contact with the inverter, and a second flow channel provided closer to the motor than the first flow channel, at a downstream side of the first flow channel.

According to the present invention, the second flow channel located downstream of the first flow channel that brought into contact with the inverter is provided closer to the motor than the first flow channel. Therefore, the heat from the motor will not be transferred to the inverter capacitor as long as passage through the second flow channel and the first flow channel is avoided. Accordingly, the transfer of heat from the motor towards the inverter can be blocked more reliably. Further, the first flow channel in contact with the inverter is located at an upstream side of the second flow channel. Therefore, the temperature of the coolant flowing through the first flow channel in contact with the inverter can be set lower than the temperature of the coolant flowing through the second flow channel, allowing the inverter to be cooled more efficiently.

A motor unit according to the present invention includes a housing in which a motor, an inverter, and a capacitor are accommodated integrally. The motor unit includes a flow channel through which a coolant flows, provided between the motor and the inverter, and a communication channel provided between the motor and the capacitor, establishing communication between the flow channel and a region outside the housing to allow flow of the coolant between the flow channel and the region outside the housing.

According to the present invention, the inverter is cooled by the coolant flowing through the flow channel. This flow channel is located between the motor and the inverter. Therefore, the heat transfer from the motor to the inverter can be blocked intentionally by the flow channel. The coolant flows through the communication channel establishing communication between the flow channel and the region outside the housing, and dissipates heat by, for example, a radiator or the like, provided outside the housing. This communication channel is located between the motor and the capacitor. Therefore, the heat transfer from the motor to the capacitor can be blocked intentionally by the communication channel. Thus, there can be provided a motor unit including a housing in which a motor, an inverter, and a capacitor are accommodated integrally, allowing heat transfer from the motor to the inverter and capacitor to be blocked.

A housing according to the present invention accommodates a motor, an inverter, and a capacitor integrally. The housing includes a motor casing in which a motor is accommodated, an inverter casing in which an inverter is accommodated, a capacitor casing in which a capacitor is accommodated, a flow channel through which a coolant flows, provided between the motor casing and the inverter casing, and a communication channel provided between the motor casing and the capacitor casing, establishing communication between the flow channel and a region outside the housing to allow flow of the coolant between the flow channel and the region outside the housing.

According to the present invention, the inverter is cooled by the coolant flowing through the flow channel. This flow channel is provided between the motor and the inverter. Therefore, the heat transfer from the motor to the inverter can be blocked intentionally by the flow channel. The coolant flows through the communication channel establishing communication between the flow channel and the region outside the housing to dissipate heat by, for example, a radiator or the like, provided outside the housing. The communication channel is located between the motor and the capacitor. Therefore, the heat transfer from the motor to the capacitor can be blocked intentionally by the communication channel. Thus, there can be provided a housing in which a motor, an inverter, and a capacitor are accommodated integrally, allowing heat transfer from the motor towards the inverter and capacitor to be blocked.

BEST MODES FOR CARRYING OUT THE INVENTION

Embodiments of the present invention will be described hereinafter with reference to the drawings. In the following, the same components have the same reference characters allotted. Their designation and function are also identical. Therefore, detailed description thereof will not be repeated.

<First Embodiment>

Figure 1:
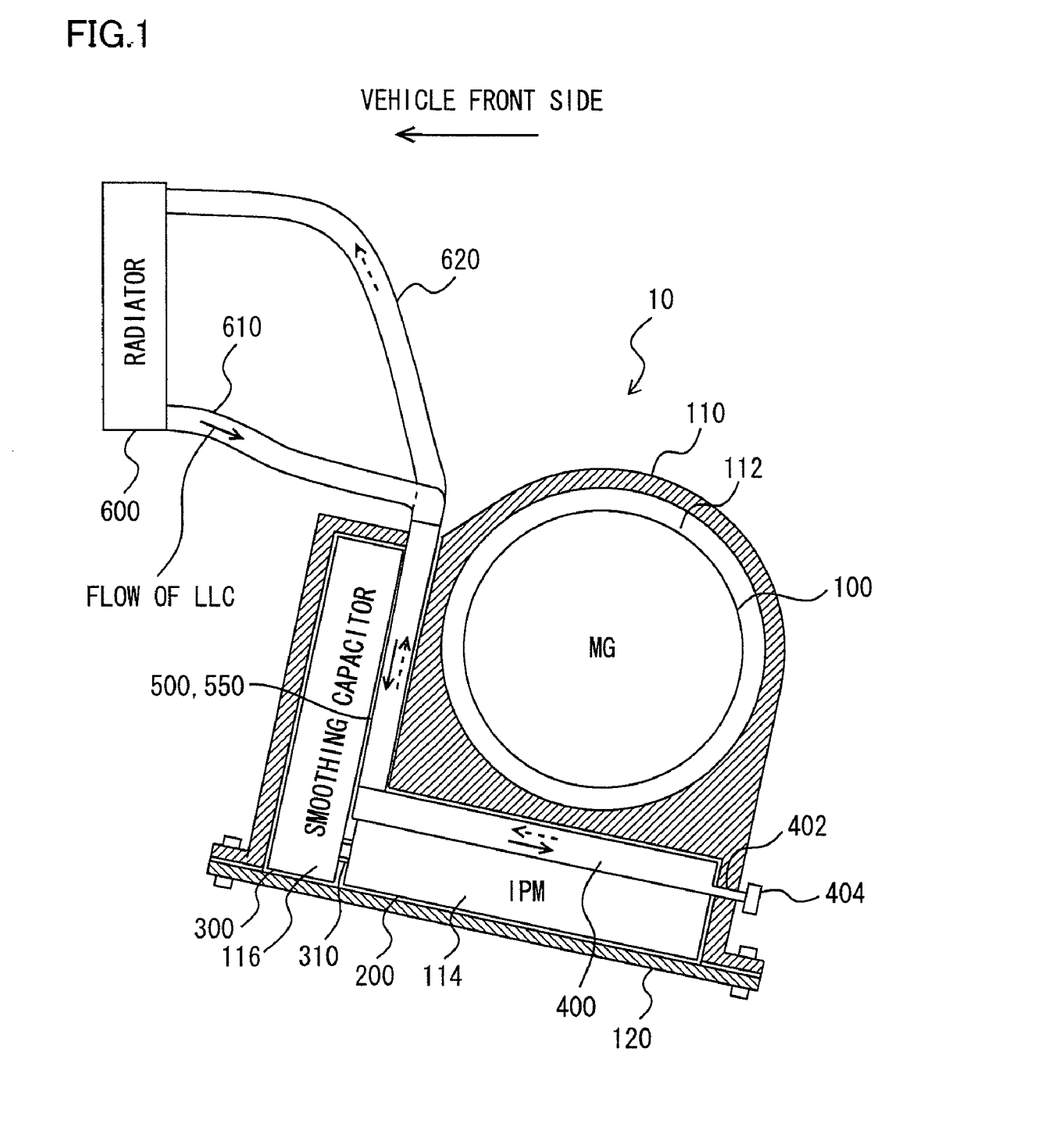
FIG. 1 represents a configuration of a vehicle on which a motor unit with a cooling structure is mounted, according to a first embodiment of the present invention.

A configuration of a vehicle incorporating a motor unit 10 with a cooling structure according to the present embodiment will be described with reference to FIG. 1. Although the present embodiment will be described based on an electric car running only by the driving force from motor unit 10 as the vehicle, the vehicle mounted with a cooling structure for a capacitor according to the present invention is not limited to an electric car, and may be applied to a hybrid vehicle. Further, the present invention is not particularly limited to motor unit 10 for driving a vehicle.

The vehicle includes a motor unit 10 providing a driving force by the power supplied from a battery (not shown), and a radiator 600. Motor unit 10 includes a motor generator (MG) 100, an IPM (Intelligent Power Module) 200, a smoothing capacitor 300, a cooler 400, a first communication channel 500, a second communication channel 550, and a housing 110 in which all these components are accommodated.

MG 100 functions as a three-phase alternating-current motor, and also as generator generating power in a vehicle regenerative braking mode. MG 100 is accommodated in a motor casing 112 provided in housing 110. MG 100 has its rotational shaft eventually connected to the drive shaft (not shown) of the vehicle. The vehicle runs by the driving force from MG 100. MG 100 generates heat during operation as a motor or generator.

IPM 200 is formed having a shape of substantially a rectangular solid, including a plurality of IGBTs (Insulated Gate Bipolar Transistor) constituting the inverter, and a control substrate on which are mounted electronic components controlling the ON/OFF (energization/shut down) of the gate of each of IGBT (not shown). IPM 200 causes MG 100 to function as a motor or generator based on a control signal from an ECU (not shown). IPM 200 generates heat by the ON/OFF of the gate of each IGBT.

IPM 200 is accommodated in an inverter casing 114 provided in housing 110 and below motor casing 112. Inverter casing 114 is provided in an inclined manner such that the front side corresponding to front direction of the vehicle is located higher under a state where housing 110 is fixed to the vehicle. Inverter casing 114 has its bottom portion open, and is sealed by a lid 120.

Smoothing capacitor 300 is formed having a shape of substantially a rectangular solid, connected to IPM 200 by an electrode line 310. Smoothing capacitor 300 temporarily stores charge in order to smooth the power from the battery for supply to IPM 200, or to smooth the power from IPM 200 for supply to the battery. Thus, occurrence of inrush current towards IPM 200 is prevented.

Smoothing capacitor 300 is accommodated in capacitor casing 116 provided at the vehicle front side direction than motor casing 112, along the direction of the lateral side of housing 110. Accordingly, IPM 200 and smoothing capacitor 300 are provided to be substantially orthogonal. Further, the lower portion of capacitor casing 116 communicates with the vehicle front side of inverter casing 114 such that the upper portion of IPM 200 and the lower portion of smoothing capacitor 300 are adjacent. Likewise with inverter casing 114, the bottom portion of capacitor casing 116 is open, and sealed by lid 120.

Cooler 400 is a metal plate located between MG 100 and IPM 200, provided in an inclined manner to contact the top face of IPM 200. A flow channel for a cooling liquid (hereinafter, also referred to as LLC (Long Life Coolant)) is provided in cooler 400 for the passage of coolant liquid.

At the upper end portion of cooler 400 are connected a first communication channel 500 and a second communication channel 550. Further, an outlet 402 is provided at the lower end portion of cooler 400.

First and second communication channels 500 and 550 are provided between MG 100 and smoothing capacitor 300, brought into contact with a side face of smoothing capacitor 300, establishing communication between cooler 400 and a region outside housing 110. The LLC flows through first communication channel 500 from the region outside housing 110 into cooler 400. The LLC flows through second communication channel 550 from the interior of cooler 400 to the region outside housing 110.

Outlet 402 is provided with a cap 404 at the lower end. By opening cap 404 at the time of exchanging the LLC, the LLC in cooler 400, first communication channel 500 and second communication channel 550 is discharged outside housing 110 by its own weight.

Radiator 600 is a device transferring the heat of the LLC outside. Radiator 600 is provided upper than motor unit 10 and at a vehicle front side direction. Radiator 600 is connected to first communication channel 500 through a circulation path 610, and is connected to second communication channel 550 through a circulation path 620. The LLC is circulated between radiator 600 and cooler 400 through circulation paths 610 and 620 by an electric water pump (not shown).

Figure 2:
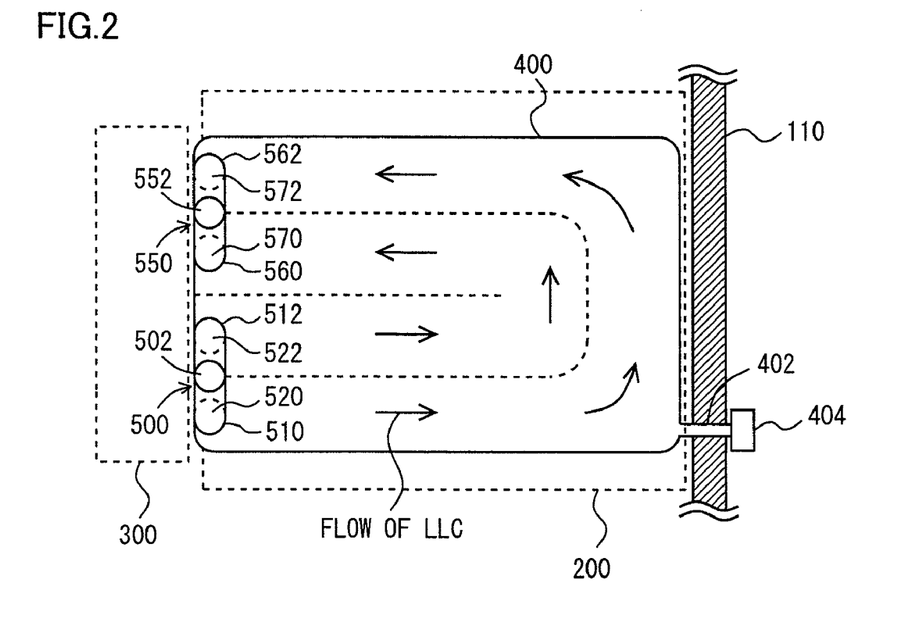
FIGS. 2 and 3 are skiagrams of a cooler and a communication channel according to the cooling structure of the first embodiment of the present invention.
Figure 3:
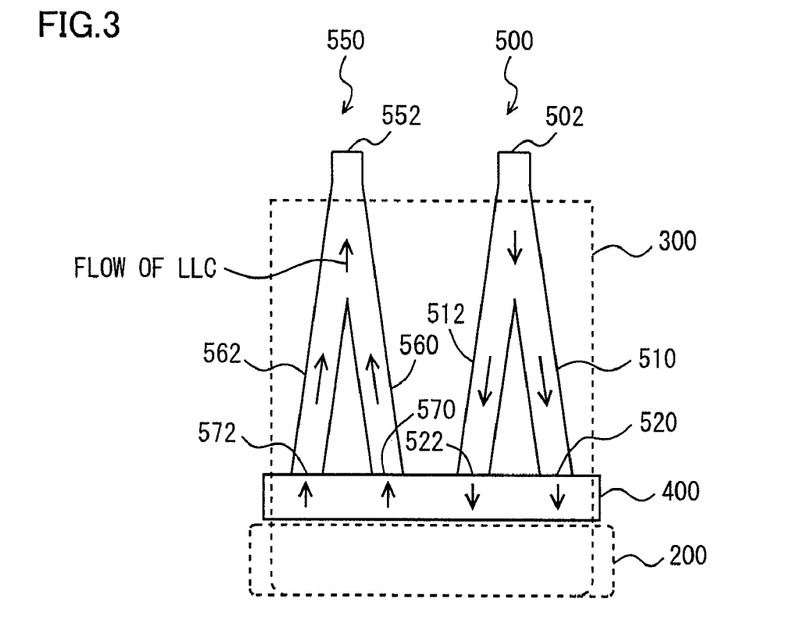

Cooler 400, first communication channel 500 and second communication channel 550 will be described with reference to FIGS. 2 and 3. FIG. 2 is a skiagram of cooler 400, first communication channel 500 and second communication channel 550, viewed from above in a direction perpendicular to the top face of IPM 200. FIG. 3 is a skiagram of cooler 400, first communication channel 500 and second communication channel 550, viewed from the vehicle front side in a direction parallel to the top face of IPM 200.

A flow inlet 502, flow-in paths 510 and 512, and connection openings 520 and 522 constitute first communication channel 500.

Flow inlet 502 is provided at the upper end of first communication channel 500, connected with circulation path 610. The LLC cooled at radiator 600 flows from circulation path 610 towards flow inlet 502. First communication channel 500 has its upper end protruding from housing 110, at the top face of housing 110 at the vehicle front side in order to reduce the distance from radiator 600 and shorten the length of circulation path 610.

First communication channel 500 is divided into flow-in path 510 and flow-in path 512 from inlet 502 towards the downstream side. Flow-in path 510 and flow-in path 512 are connected to the upper end portion of cooler 400 through connection openings 520 and 522, respectively, provided at their lower ends.

Second communication channel 550 is located at the right side of the vehicle with respect to first communication channel 500. A flow outlet 552, flow-out paths 560 and 562, and connection openings 570 and 572 constitute second communication channel 550.

Flow-out path 560 and flow-out path 562 are connected to the upper end portion of cooler 400 through connection openings 570 and 572, respectively, located at their lower ends. Flow-out path 560 and flow-out path 562 are connected so as to merge midway before arrival at flow outlet 552.

Flow outlet 552 is provided at the upper end of second communication channel 550, and is connected with circulation path 620. The LLC running through cooler 400 flows out from flow outlet 552 towards circulation path 620. Second communication channel 550 has its upper end protruding from housing 110, at the top face of housing 110 at the vehicle front side in order to reduce the distance from radiator 600 and shorten the length of circulation path 620.

A flow channel through which the LLC flowing in via connection openings 520 and 522 is circulated and discharged from connection openings 570 and 572 is formed inside cooler path 400.

The action of the cooling structure according to the present embodiment will be described based on the structure set forth above. When MG 100 is driven, heat is generated from MG 100 and IPM 200.

Figure 4:
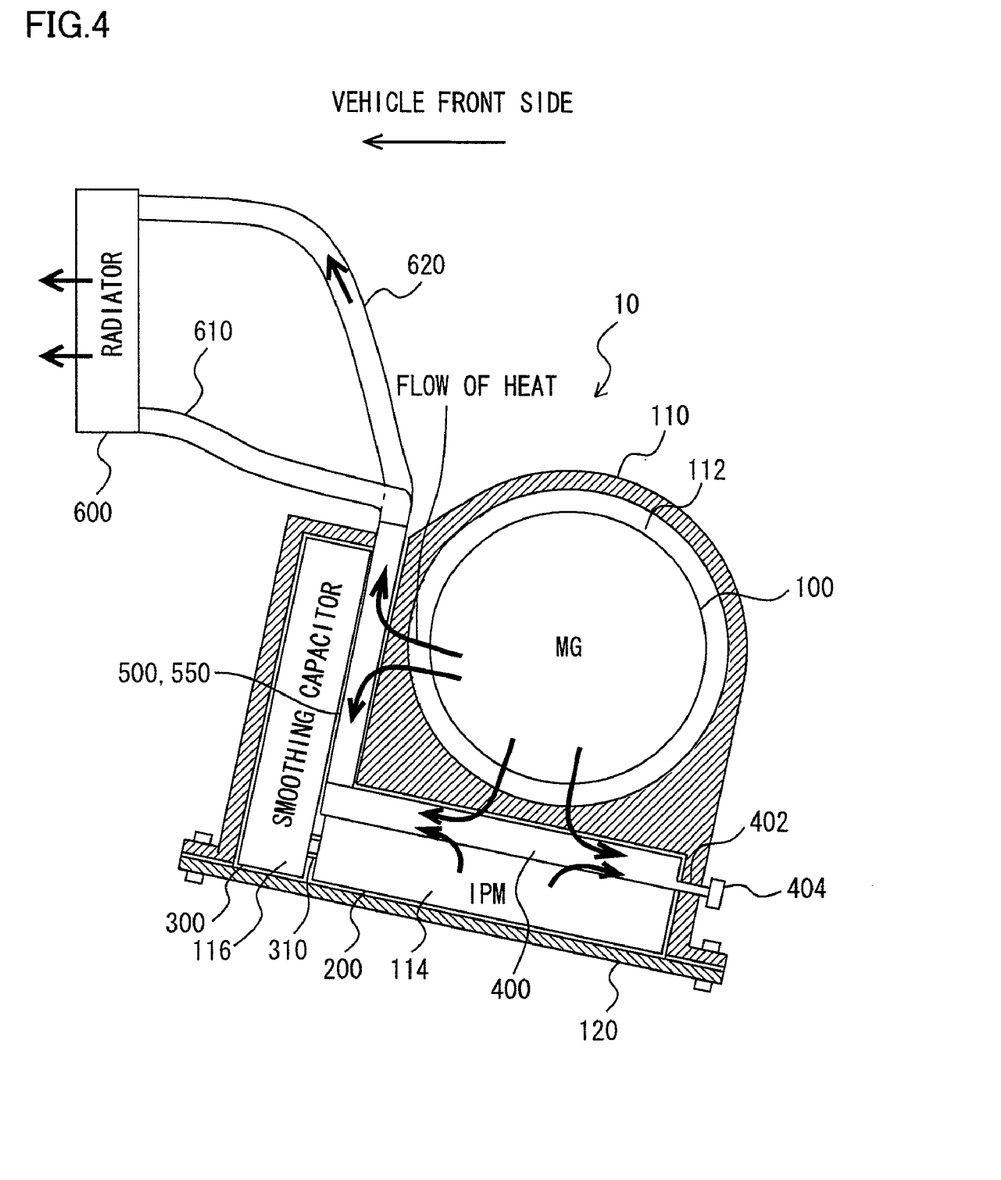
FIG. 4 represents the flow of heat in the cooling structure according to the first embodiment of the present invention.

Cooler 400 through which the LLC flows is provided between MG 100 and IPM 200, brought into contact with the top face of IPM 200. As shown in FIG. 4, the heat from IPM 200 is absorbed by the LLC circulating the interior of cooler 400, whereby IPM 200 is cooled. Further, the heat generated from MG 100 is transferred to cooler 400 via housing 110, as shown in FIG. 4. Therefore, the heat transfer from MG 100 towards IPM 200 can be blocked intentionally by cooler path 400.

The LLC in cooler 400 is circulated to and from radiator 600 through first communication channel 500 and second communication channel 550. These first and second communication channels 500 and 550 are located between MG 100 and smoothing capacitor 300. Therefore, the heat from MG 100 transferred to housing 110 is partially absorbed by the LLC flowing through first communication channel 500 and second communication channel 550, as shown in FIG. 4. Accordingly, the heat transfer from MG 100 towards smoothing capacitor 300 can be blocked intentionally by first and second communication channels 500 and 550.

Further, cooler 400 is provided in an inclined manner to contact the top face of IPM 200. The upper end of cooler 400 is connected with first communication channel 500 and second communication channel 550. Therefore, even in the case where air is introduced into cooler 400, the air will escape to first and second communication channels 500 and 550 through connection openings 520, 522, 570 and 572. The air in first and second communication channels 500 and 550 is further elevated to be discharged outside housing 110 through flow inlet 502 and outlet 552. Accordingly, the accumulation of air at cooler 400 and/or first and second communication channels 500 and 550 can be suppressed reliably. Therefore, degradation in the cooling performance of IPM 200 can be suppressed, and the heat transfer from MG 100 towards IPM 200 and smoothing capacitor 300 can be blocked more efficiently.

According to the cooling structure of the present embodiment, the cooler through which the LLC flows is provided between the motor generator and IPM. In addition, the communication channel through which the LLC inside the cooler passes during circulation to and from the radiator is provided between the motor generator and the smoothing capacitor. Therefore, the heat transfer from the motor generator to the IPM and the smoothing capacitor can be blocked intentionally by virtue of the cooler and communication channels.

<Second Embodiment>

Figure 5:
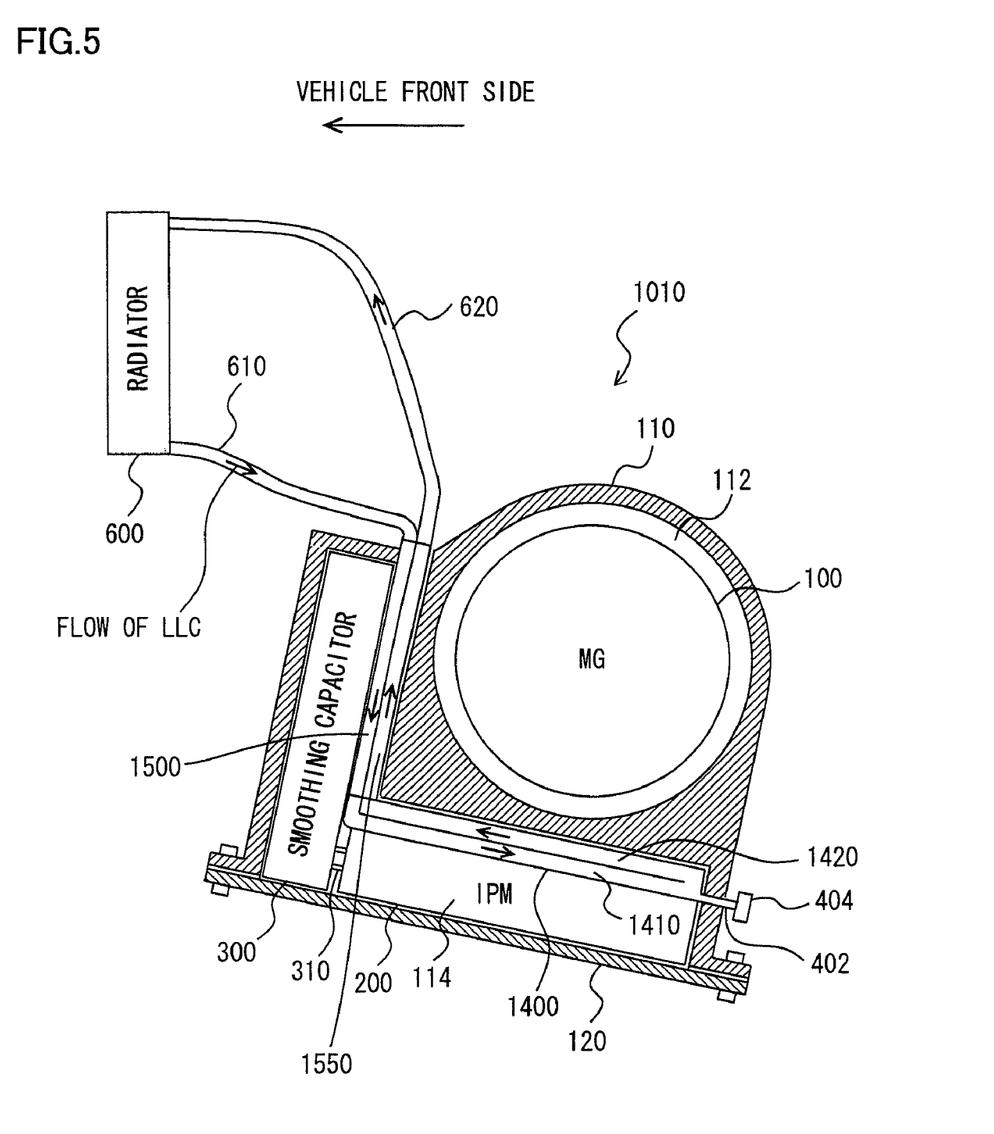
FIG. 5 represents a configuration of a vehicle on which a motor unit with a cooling structure is mounted, according to a second embodiment of the present invention.

A motor unit 1010 with a cooling structure of the present embodiment will be described with reference to FIG. 5. Motor unit 1010 of the present embodiment differs in configuration from motor unit 10 of the first embodiment set forth above in that cooler 400, first communication channel 500 and second communication channel 550 are replaced with a cooler 1400, a first communication channel 1500, and a second communication channel 1550. The remaining configuration is similar to that of the vehicle in the previous first embodiment. The same elements have the same reference characters allotted. Their functions are also identical. Therefore, detailed description thereof will not be repeated.

Cooler 1400 is a metal plate provided between MG 100 and IPM 200 in an inclined manner. A first flow channel 1410 and a second flow channel 1420 through which the LLC passes are provided in cooler 1400. First flow channel 1410 is provided to form contact with the top face of IPM 200. Second flow channel 1420 is provided at a downstream side of first flow channel 1410, along the top face of first flow channel 1410, closer to MG 100 than first flow channel 1410.

First communication channel 1500 is provided to form contact with a lateral side of smoothing capacitor 300, having the upper end and lower end connected to circulation path 610 and first flow channel 1410, respectively.

Second communication channel 1550 is provided along the lateral face of first communication channel 1500, closer to MG 100 than first communication channel 1500, and having the upper end and lower end connected to circulation path 620 and second flow channel 1420, respectively.

Figure 6:
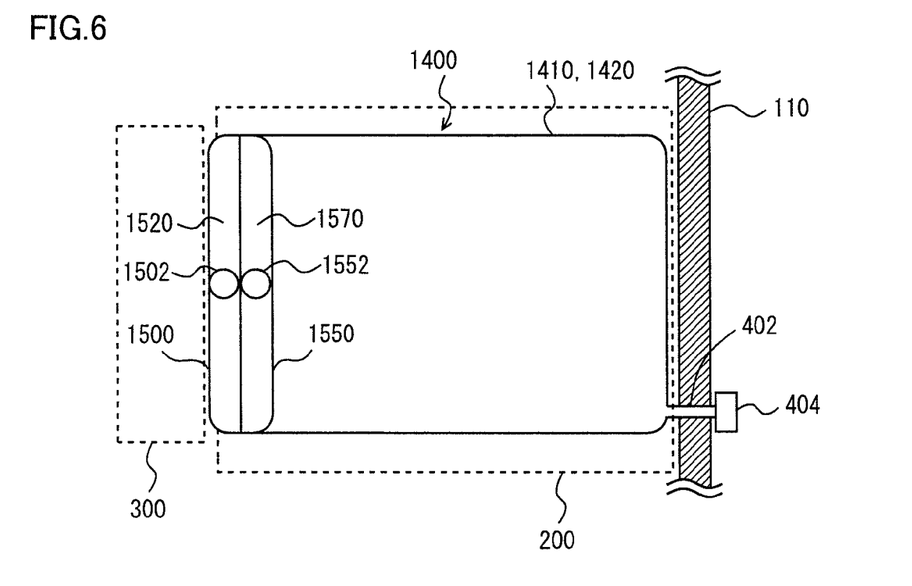
FIGS. 6 and 7 are skiagrams of a cooler and a communication channel according to the cooling structure of the second embodiment of the present invention.
Figure 7:
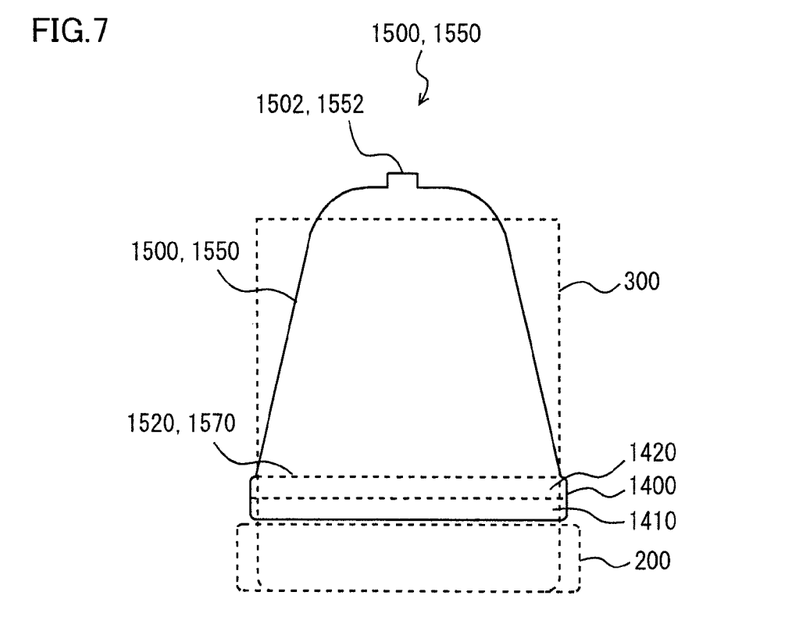

First communication channel 1500 and second communication channel 1550 will be described with reference to FIGS. 6 and 7. FIG. 6 is a skiagram of cooler 1400, first communication channel 1500 and second communication channel 1550, viewed from above in a direction perpendicular to the top face of IPM 200. FIG. 7 is a skiagram of cooler 1400, first communication channel 1500 and second communication channel 1550, viewed from the vehicle front side in a direction parallel to the top face of IPM 200.

First communication channel 1500 is connected to circulation path 610 at a flow inlet 1502 provided at the upper end, and is connected to the upper end of first flow channel 1410 at a connection opening 1520 provided at the lower end. First communication channel 1500 is formed such that the area of contact with the side face of smoothing capacitor 300 increases from the side of flow inlet 1502 towards the side of connection opening 1520 corresponding to the downstream side.

Second communication channel 1550 is connected to circulation path 620 at a flow outlet 1552 provided at the upper end, and is connected to the upper end portion of second flow channel 1420 at a connection opening 1570 located at the lower end. Second communication channel 1550 is formed to match the side face of first communication channel 1500.

The function of the cooling structure according to the present embodiment based on the structure set forth above will be described. Cooler 1400 is provided between MG 100 and IPM 200. In addition, first and second communication channels 1500 and 1550 are provided between MG 100 and smoothing capacitor 300. Therefore, likewise with the first embodiment, the heat transfer from MG 100 towards IPM 200 and smoothing capacitor 300 can be blocked intentionally.

Figure 8:
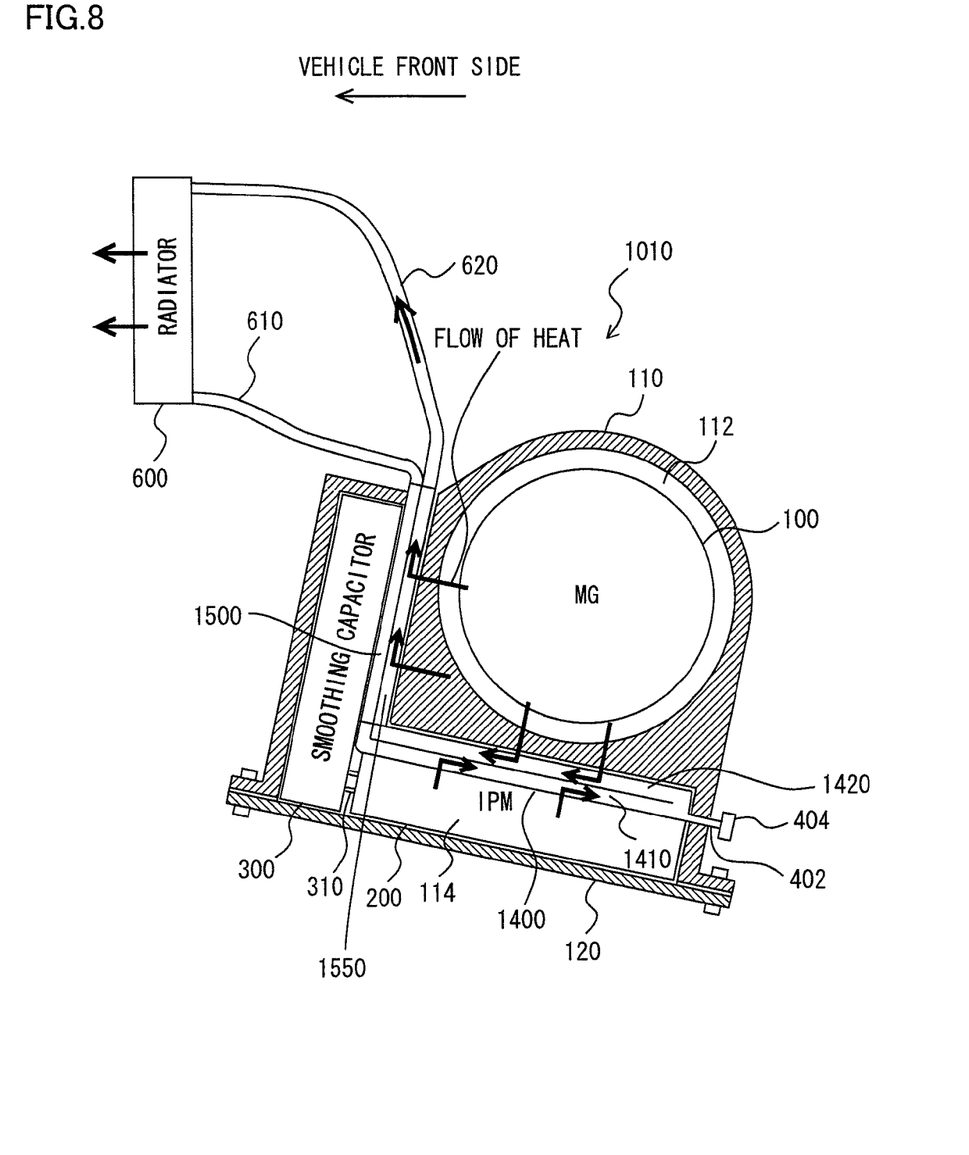
FIG. 8 represents the flow of heat in the cooling structure according to the second embodiment of the present invention.

Second communication channel 1550 is provided closer to MG 100 than first communication channel 1500. Therefore, the heat from MG 100 will not be transferred to smoothing capacitor 300 as long as passage through second communication channel 1550 and first communication channel 1500 is avoided. Therefore, the heat transfer from MG 100 to smoothing capacitor 300 can be blocked more reliably. In addition, as shown in FIG. 8, the LLC absorbing the heat from IPM 200 and MG 100 will not flow through first communication channel 1500 in contact with smoothing capacitor 300 since the LLC flows outside housing 110 through second communication channel 1550. Therefore, the transfer of heat from IPM 200 and MG 100 to smoothing capacitor 300 via the LLC can be suppressed.

In addition, cooler 1400 has the interior divided into second flow channel 1420 and first flow channel 1410. Second flow channel 1420 provided at the downstream side of first flow channel 1410 is provided closer to MG 100 than first flow channel 1410. Accordingly, the heat from MG 100 will not be transferred to IPM 200 as long as passage through second flow channel 1420 and first flow channel 1410 is avoided. Therefore, the heat transfer from MG 100 towards IPM 200 can be blocked more reliably. Further, as shown in FIG. 8, first flow channel 1410 in contact with IPM 200 is located at an upstream side of second flow channel 1420. Therefore, the temperature of the LLC flowing through first flow channel 1410 can be set lower than the temperature of the LLC flowing through second flow channel 1420, allowing IPM 200 to be cooled more efficiently.

Further, first communication channel 1500 is formed such that the area of contact with the side face of smoothing capacitor 300 is increased from inlet 1502 towards the downstream side. Therefore, more heat transfer from MG 100 towards smoothing capacitor 300 can be blocked.

According to the cooling structure of the present embodiment, the cooler is provided between the motor generator and IPM, and a communication channel is provided between the motor generator and smoothing capacitor. Therefore, the heat transfer from the motor generator towards the IPM and smoothing capacitor can be blocked intentionally, likewise with the first embodiment. Further, the flow channel at the downstream side in the cooler is located closer to the motor generator than the flow channel at the upstream side, and the second communication channel is located closer to the motor generator than the first communication channel. Accordingly, the heat transfer from the motor generator to the IPM and smoothing capacitor can be blocked more reliably.

It should be understood that the embodiments disclosed herein are illustrative and non-restrictive in every respect. The scope of the present invention is defined by the terms of the claims, rather than the description above, and is intended to include any modification within the scope and meaning equivalent to the terms of the claims.

The invention claimed is:

1. A cooling structure for an inverter and a capacitor accommodated integrally with a motor in a housing of said motor, said cooling structure comprising:
   a flow channel through which a coolant flows, provided between said motor and said inverter, and
   a communication channel provided between said motor and said capacitor, establishing communication between said flow channel and a region outside said housing to allow flow of the coolant between said flow channel and the region outside said housing,
   wherein the coolant comprises a liquid coolant,
   wherein
   said communication channel includes
   a first communication channel through which said coolant flows from the region outside said housing into said flow channel, and
   a second communication channel provided closer to said motor than said first communication channel, and through which said coolant flows from said flow channel out to the region outside said housing.

2. A cooling structure for an inverter and a capacitor accommodated integrally with a motor in a housing of said motor, said cooling structure comprising:
   a flow channel through which a coolant flows, provided between said motor and said inverter, and
   a communication channel provided between said motor and said capacitor, establishing communication between said flow channel and a region outside said housing to allow flow of the coolant between said flow channel and the region outside said housing
   wherein the coolant comprises a liquid coolant,
   wherein said flow channel includes
   a first flow channel brought into contact with said inverter, and
   a second flow channel provided closer to said motor than said first flow channel, at a downstream side of said first flow channel.

* * * * *